United States Patent [19]

Kuroda et al.

[11] Patent Number: 4,687,649

[45] Date of Patent: * Aug. 18, 1987

[54] FLUE GAS DESULFURIZATION PROCESS

[75] Inventors: Hiroshi Kuroda; Tsukasa Nishimura; Masakatsu Nishimura; Taiki Hashimoto; Osamu Kanda; Shigeru Nozawa; Kenji Shibata, all of Kure, Japan

[73] Assignee: Babcock-Hitachi Kabushiki Kaisha, Tokyo, Japan

[*] Notice: The portion of the term of this patent subsequent to Dec. 11, 2001 has been disclaimed.

[21] Appl. No.: 571,065

[22] Filed: Jan. 16, 1984

Related U.S. Application Data

[63] Continuation-in-part of Ser. No. 350,598, Feb. 22, 1982, Pat. No. 4,487,784.

[30] Foreign Application Priority Data

Sep. 9, 1983 [JP] Japan ................ 58-166363

[51] Int. Cl.$^4$ .................. C01B 17/00; C01F 11/46
[52] U.S. Cl. .................... 423/242; 423/240; 423/555
[58] Field of Search .......... 423/242 A, 244 A, 242 R, 423/240 R, 244 R, 555

[56] References Cited

U.S. PATENT DOCUMENTS

| | | | |
|---|---|---|---|
| 2,080,779 | 5/1937 | Lessing | 423/242 |
| 3,873,672 | 3/1975 | Nishiba et al. | 423/242 |
| 3,935,296 | 1/1976 | Morita et al. | 423/242 |
| 3,995,006 | 11/1976 | Downs et al. | 423/242 |
| 4,487,784 | 12/1984 | Kuroda et al. | 423/242 |

Primary Examiner—Gregory A. Heller
Attorney, Agent, or Firm—Fay, Sharpe, Beall, Fagan, Minnich & McKee

[57] ABSTRACT

A flue gas desulfurization process by which gypsum can be recovered; the amount of water used therein is small, the effluent is treated in a closed system, the equipment used is minimized, and no scaling occurs; and an apparatus therefor are provided, the process including the following first process and second process: the first process comprising a cooling step of cooling and de-dusting a $SO_2$-containing flue gas and removing acidic gases, an absorption step of contacting the cooled gas with a slurry containing limestone and lime to absorb and remove $SO_x$ and form $CaSO_3$, a pH-adjusting step of adding $H_2SO_4$ to the resulting slurry, an oxidation step of blowing an oxygen-containing gas in the pH-adjusted slurry to form gypsum, a step of concentrating the resulting gypsum slurry, a step of adjusting the concentration of the resulting slurry, a step of centrifugally separating gypsum, and a step of treating the effluent discharged from the cooling step, and the second process comprising, in the first process, further feeding the slurry of the absorption step to the cooling step where unreacted limestone is reacted with $SO_2$ to form $CaSO_3$.

9 Claims, 22 Drawing Figures

FIG. I-2
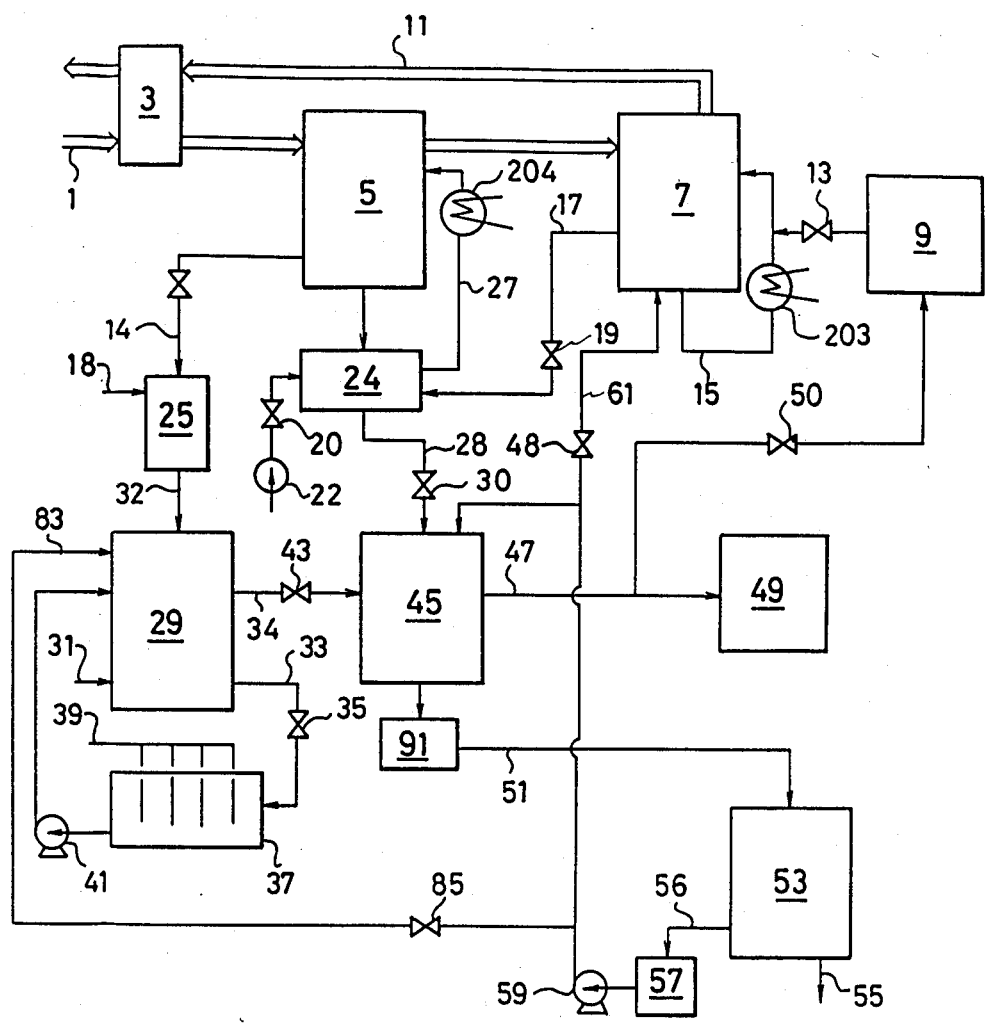

FLUE GAS DESULFURIZATION PROCESS

This is a continuation-in-part of application Ser. No. 350,598, filed Feb. 22, 1982 and now U.S. Pat. No. 4,487,784, issued Dec. 11, 1984.

BACKGROUND OF THE INVENTION

This invention relates to a flue gas desulfurization process and an apparatus therefor. More particularly it relates to a wet type flue gas desulfurization process by removing sulfur oxides ($SO_x$) contained in flue gases, with limestone ($CaCO_3$), quick lime (CaO) or slaked lime ($Ca(OH_2)$) as an absorber, and at the same time recovering gypsum ($CaSO_4.2H_2O$) as byproduct.

Wet type flue gas desulfurization processes have been directed to a process of converting sulfur oxides $SO_x$ (usually $SO_2$ or $SO_3$) contained in flue gases, into gypsum which is chemically stable and utilizable, with $CaCO_3$, CaO or $Ca(OH)_2$ as raw material, which is abundantly existent in nature and cheaply available, to make flue gases harmless.

Conventional flue gas desulfurization processes comprise a cooling step, an absorption step, a concentration step and a flue gas heating step. Namely, flue gas is first introduced into the cooling step where it is partly desulfurized, at the same time cooled and dedusted and then sent to the absorption step where it is contacted with a slurry containing limestone and lime (which slurry will hereinafter often be referred to as absorber slurry or limestone slurry) and desulfurized therewith and then sent to the flue gas heating step where it is heated and exhausted. The slurry containing limestone and lime absorbs sulfur oxides in the absorption step and byproduces calcium sulfite ($CaCO_3$) and calcium hydrogen sulfite ($Ca(HSO_3)_2$), but since the slurry partly contains unreacted $CaCO_3$ and slaked lime ($Ca(OH)_2$), it is recycled to the cooling step where the amounts of $CaCO_3$, etc. are reduced. Further, a part of $CaSO_3$ and $Ca(HSO_3)_2$ as byproducts is oxidized in the absorption step and the cooling step to form gypsum. The slurry used in the cooling step is sent to the concentration step. Water separated therein is reused, while concentrated solids ($CaSO_3$, $Ca(HSO_3)_2$ and $CaSO_4$) are discarded into a pond adjucent to the step. Further, after the solids are precipitated, the resulting water may often be reused.

However, according to the above-mentioned conventional processes, the byproducts consist of a mixture of $CaSO_3$, $CaCO_3$; hence they, even if recovered, contain a large amount of byproducts so that it is impossible to effectively utilize them. Further, even in the concentration step, since $CaSO_3$ and $Ca(HSO_3)_2$ are existent in large amount, particles have particle diameters as small as several μm and also are inferior in settlability; hence as the concentration apparatus, the apparatus capacity such as that of the settling tank is inevitable to be enormously enlarged. As mentioned above, various problems have been raised. Furthermore, in the case where a slurry of calcium compounds is used as an absorber, calcium sulfite and calcium sulfate as byproducts are a main cause of scaling; hence the problem of scaling is inevitable and requires countermeasures.

From such a viewpoint, there has been desired a process by which gypsum can be recovered as byproduct in accordance with its uses, the amount of water used therein is small, effluent treatment can be carried out in a closed system, no scaling occurs and reliability is high. Further, in this case, from a viewpoint of process efficiency, a process using an apparatus as minimal as possible has been desired.

An object of the present invention is to provide a process which is able to recover different qualities of gypsum corresponding to its uses in a flue gas desulfurization system.

Another object of the present invention is to provide a desulfurization process by which the amount of water used is small as well as a process by which effluent treatment can be carried out in a closed system.

Still another object of the present invention is to provide, from a viewpoint of process efficiency, a flue gas desulfurization process which enables the apparatus to be used as minimal as possible, has a high reliability, and is commercially superior.

The other objects of the present invention will be apparent from the following description.

SUMMARY OF THE INVENTION

A first process of the present invention, which process will be referred to herein as "dust separation system", comprises a cooling step of cooling and dedusting a $SO_x$ containing flue gas and removing acidic gases (HCl, HF) contained therein;

an absorption step of contacting the flue gas cooled in the cooling step with a slurry containing limestone and lime (absorber slurry) to absorb and remove $SO_x$ in the gas and at the same time form calcium sulfite;

a pH-adjusting step of adding sulfuric acid to the slurry containing the calcium sulfite obtained in the absorption step to adjust its pH;

an oxidation step of blowing an oxygen-containing gas into the slurry after the pH adjustment to form gypsum;

a concentration step of concentrating the gypsum slurry obtained in the oxidation step to obtain a high concentration gypsum slurry;

a step of centrifugally separating gypsum after adjusting the concentration of the concentrated slurry obtained in the gypsum concentration step; and an effluent treatment step of treating the effluent discharged from the cooling step.

Further, a second process of the present invention is directed to a process wherein, in the above first process, the slurry of the absorption step is further fed to the cooling step where unreacted limestone is reacted with $SO_2$ to form calcium sulfite; according to this process, mixing of dust in the byproduced gypsum is inevitable; hence this process will be referred to herein as "dust mixing system".

According to the above dust separation system, the pH adjusting step and the calcium sulfite oxidation step can be carried out by ejecting the dedusted and cooled exit gas from the cooling step through an ejector into the slurry from the absorption step or by reacting the gas with the slurry in the reactor, to produce gypsum.

According to the dust mixing system, it is possible to carry out the pH-adjusting step and the calcium sulfite oxidation step in the slurry circulation system without employing a pH-adjusting tank and an oxidation tower, to produce gypsum.

In the dust separation system and the dust mixing system according to the present invention, it is possible to provide a slurry cooler in the circulation system of the absorption tower or in the circulation system of the cooling tower in order to recover water from the flue gas or inhibit water vaporization into the flue gas, to thereby render the above processes those wherein the amount of water used therein is small.

BRIEF DESCRIPTION OF THE DRAWINGS

FIG. 1-2 shows an illustrative view of the whole of the flue gas desulfurization process using limestonelime as absorber, according to the dust mixing system of the present invention.

FIG. 2 shows a state diagram illustrating the relationship between the boiler flue gas temperature and the molar humidity under various conditions.

DETAILED DESCRIPTION OF THE INVENTION

Figure 1:
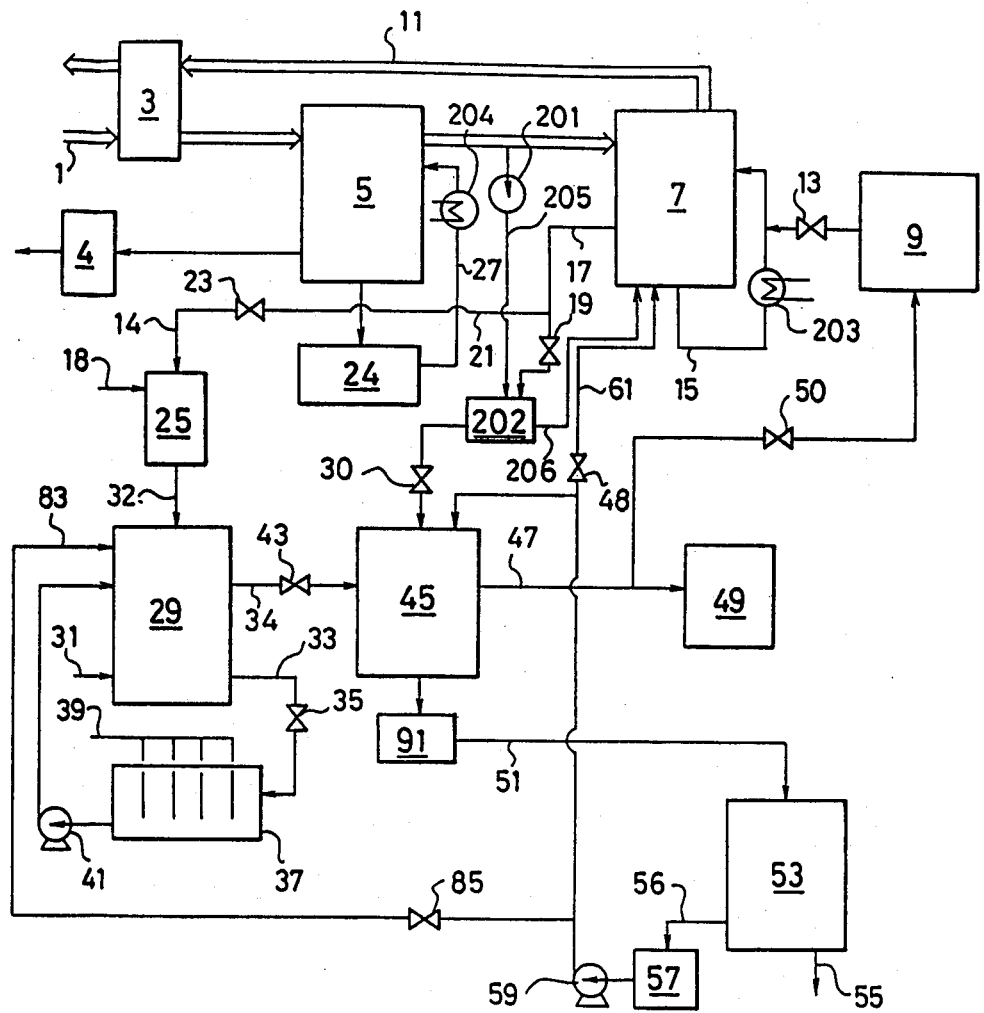
FIG. 1-1 shows an illustrative view of the whole of the flue gas desulfurization process using limestonelime as absorber, according to the dust separation system of the present invention.

First, the whole of the flue gas desulfurization process according to the dust separation system of the present invention will be described by way of FIG. 1-1.

Referring to this figure, a sulfur oxides-containing flue gas 1 is led through a gas heater 3 into a cooling tower 5 wherein dust and acidic gases in the flue gas are removed and cooled, and further led into an absorption tower 7 wherein the gas is contacted with an absorber (limestone, lime, etc.) fed from an absorber slurry tank 9 and the sulfur oxides in the flue gas react with the absorber and are removed in the form of calcium sulfite. The resulting purified gas 11 is led into the gas heater 3 wherein it is reheated by heat exchange with the high temperature flue gas 1, and exhausted into the atmosphere without forming white smoke. On the other hand, the absorber slurry is fed from the tank 9 through a valve 13 to an absorber slurry circulation line 15. The absorber slurry is contacted with the flue gas in the absorption tower 7 wherein $SO_2$ in the flue gas is removed in the form of $CaSO_3$ or $Ca(HSO_3)_2$ according to the following equations:

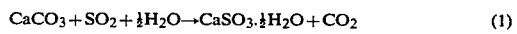
$$CaCO_3 + SO_2 + \tfrac{1}{2}H_2O \rightarrow CaSO_3 \cdot \tfrac{1}{2}H_2O + CO_2 \tag{1}$$

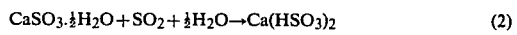
$$CaSO_3 \cdot \tfrac{1}{2}H_2O + SO_2 + \tfrac{1}{2}H_2O \rightarrow Ca(HSO_3)_2 \tag{2}$$

The slurry containing calcium sulfite formed in the absorption tower 7 and unreacted absorber is fed through lines 17 and 21, a valve 23 and a line 14 into a pH-adjusting tank 25 wherein the pH of the slurry is adjusted to that required for the subsequent oxidation, with sulfuric acid fed from a line 18, and then fed to an oxidation tower 29 wherein $Ca(HSO_3)_2$ in the slurry is oxidized by air led through a line 31 to form gypsum $(CaSO_4 \cdot 2H_2O)$ according to the following equations:

$$Ca(HSO_3)_2 + \tfrac{1}{2}O_2 + 2H_2O \rightarrow CaSO_4 \cdot 2H_2O + H_2SO_3 \tag{3}$$

$$CaSO_3 \cdot \tfrac{1}{2}H_2O \tfrac{1}{2}O_2 + 3/2H_2O \rightarrow CaSO_4 \cdot 2H_2O \tag{4}$$

The oxidation reaction expressed by the above equations occurs when oxygen in air dissolves in the slurry and contact with $CaSO_3$ therein. On the other hand, the solubility of $CaSO_3$ greatly varies depending on the pH of the slurry, and the lower the pH, the higher the solubility. However, the solubility of oxygen in the slurry is about 6 ppm at normal temperatures and normal pressures, and even if the pH is considerably lowered, the oxidation rate is not affected so much, and on the contrary, sulfuric acid is wasted. Thus, the preferred pH of the slurry in the oxidation step is 5 or lower, more preferably about 4.5 to 3.5. However, in the oxidation tower, there often is formed $S_2O_6^{2-}$ (dithionic acid) which constitutes the main cause of COD (chemical oxygen demand) in the desulfurized effluent, and if the pH at the time of oxidation is too low, the amount of the acid formed increases. In such a case, it is possible to control the pH in the pH-adjusting step so as to give a pH of 5 to 6 at the exit of the oxidation tower. The theoretical amount of oxygen fed for the oxidation may be calculated from the amount of $CaSO_3$ at the inlet of the oxidation tower. Further, the oxidation rate in the oxidation tower increases by increasing the amount of air fed, but the particle diameter of gypsum byproduced is affected by the oxidation rate, and if the oxidation rate is higher, the particle diameter becomes finer; hence in view of the grade of byproduct, it is preferred to introduce air in an amount in the range of 1.5 to 3 times the theoretical amount.

The pH adjustment of the slurry fed to the pH-adjusting tank 25 and its oxidation in the oxidation tower 29 may be carried out by using the flue gas. When the oxidation is carried out with the flue gas, a reactor 202 may be employed for the oxidation in place of the oxidation tower 29. Namely, a portion of the flue gas after dedusting and cooling is separated by means of a fan 201. This portion together with the slurry 17 withdrawn from the absorption tower 7 at its exit and passed through a valve 19 are led into the reactor 202 where a good contact thereof is effected. As a result, unreacted $CaCO_3$ in the slurry sent from the exit of the absorption tower 7 reacts with $SO_2$ in the flue gas to form calcium sulfite, which is then oxidized together with calcium sulfite formed in the absorption tower 7, by the oxygen in the flue gas to form gypsum. In this case, since $SO_3$ is contained in the flue gas, it is possible to carry out the pH adjustment of the slurry at the same time. As for the reactor 202, an ejector having a good efficiency of gas-liquid contact or a reactor provided with a bubble generating apparatus such as atomizer is preferably employed. The slurry leaving the reactor 202 is then led through a valve 30 into a concentrator 45.

In the oxidation tower 29, the slurry containing calcium sulfite is mixed with air with stirring and in this case, there may occur troubles such as incapability of feeding air through the line 31 e.g. due to clogging of the air-feeding line. In such a case, the slurry in the oxidation tower is withdrawn and led through a line 33 and a valve 35 into an urgent flow tank 37 where air is blown therein through a line 39 to prevent the slurry from settling and coagulating. The resulting slurry is again returned to the oxidation tower through a pump 41. The urgent blow tank 37 may also be used as a tank for retaining the slurry of the absorption system and that of the gypsum recovery system.

The slurry leaving the oxidation tower 29 or the reactor 202 is then led through a valve 43 or a valve 30 into a concentrator 45 where it is separated into a concentrated slurry and a filtrate. This filtrate is returned through a line 47 and a valve 50 to the limestone slurry tank 9 and used therein for diluting limestone. This filtrate may also be used as water fed to the cooling step or as washing water for various parts of the apparatus.

On the other hand, the concentrated slurry is led from the concentrator 45 through a concentration-adjusting tank 91 and a line 51 to a centrifugal separator 53 where solid-liquid separation is effected. Gypsum separated in the centrifugal separator 53 is withdrawn through a line 55, and the filtrate is returned through a line 56, a tank 57 and a pump 9 into the concentrator 45 and a portion of the filtrate is returned through a valve 48 and a line 61 to the absorption tower 7 wherein the gypsum particles in this filtrate are utilized as seed crystals to prevent gypsum scale from forming in the the absorption tower.

The amount of the filtrate in the centrifugal separator 53 to be returned to the absorption system is preferred to be such an amount that the gypsum concentration in the slurry contained in the absorption system is 5% by weight or higher so that the effectiveness of the seed crystals may be exhibited, and the amount of the filtrate to be finally returned is determined based on the relation thereof with an amount in which $CaSO_3$ and $Ca(HSO_3)_2$ are oxidized in the absorption system by $O_2$ in the flue gas.

In order to prevent the absorption system (the absorber slurry tank 9 for the absorption tower and related pipings) from developing gypsum scale; the slurry at the exit of the oxidation tower or the concentrated slurry at the exit of the concentrator may be returned to the absorption system. However most of the gypsum particles contained in these slurries are crystal particles which have fully grown and; hence they are not so effective as seed crystals. Whereas the gypsum particles contained in the effluent from the centrifugal separator are mostly those which have passed through the filter cloth (or metal gauze), have small particle diameters, and contain a large amount of ungrown fine crystals (nuclei) and hence they are notably effective as seed crystals.

Figure 2:
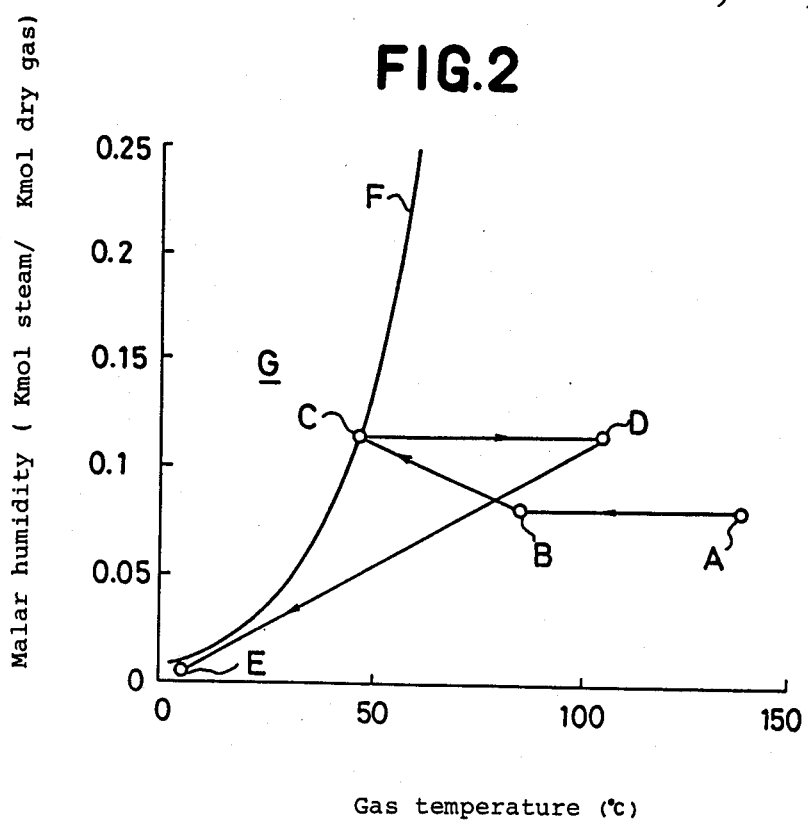

FIG. 2 shows the relationship between the flue gas temperature and humidity in the wet type desulfurization apparatus. The flue gas under the conditions at a point A is subjected to heat removal by a gas-gas heater and takes a state at a point B at the inlet of the cooling tower. Thereafter the flue gas is cooled and humidified along an adiabatic cooling line in the cooling step and reaches a saturation temperature (a point C) at the exit of the absorption tower. In the gas-gas heater, the gas is usually reheated up to a temperature of the white smoke-generating limit or higher (conditions at a point D at the inlet of chimney) and exhausted from a stack. In this FIG. 2, E represents atmospheric conditions; F, a humidity curve at a relative humidity of 100%; and G, a white smoke-generating zone. The product of the humidity difference by the gas amount at the point B and the point C corresponds to the amount of water vaporized in the cooling step, and this amount reaches a value as large as about 70 to 100 t/h in the case of flue gas-treating desulfurization apparatus of 1000 MW class. Thus, in the present invention, as shown in FIG. 1-1, the slurries of the slurry circulating systems of the cooling tower or/and the absorption tower are indirectly cooled by cooler 203 or cooler 204 and contacted with the flue gas whereby it is possible to inhibit generation of vaporized water and also condense the saturated steam in the flue gas to thereby utilize the thus recovered water and further reduce the amount of water consumed.

According to the dust separation system of the present invention, that is, a system of circulating water in the cooling tower without circulating the $CaCO_3$-containing slurry therein, to remove dust and acidic gases in the flue gas, a definite amount of slurry is discharged from the cooling tower 5 to the outside of the system and treated in an effluent-treating apparatus 4, as shown in FIG. 1-1, to prevent the corrosion and abrasion of the materials of the cooling tower due to concentration of acidic materials and dust in the cooling tower.

Figure 3:
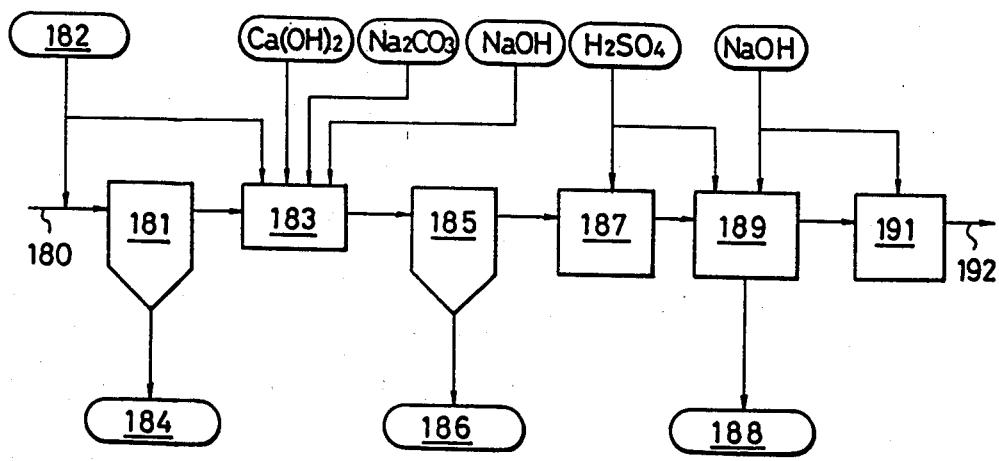
FIG. 3 shows a flow sheet illustrating the effluent treatment in the case where there is no discharge regulation as to Cl (chlorine) ion in the effluent.

FIG. 3 shows an example of flow sheets of such an effluent-treating apparatus. A flocculant 182 is added to the effluent 180 from the cooling step, and the resulting effluent is successively passed through a thickner for removing fs (floating solids) 181 (ss-removing step), a tank for settling with alkali 183, a heavy metals-removing thickner 185 (these means belong to steps for removing fs, fluorine and heavy metals), a pH-adjusting tank 187, a COD component-adsorbing tank 189 (these means belong to COD-removing step), and a pH-adjusting tank 191, to successively remove fs, heavy metals and COD component. In addition, in this figure, numeral 184 represents a tank for sludge (fly ash), 186, a sludge tank, and 188, regenerated water.

However, in the case where this desulfurization apparatus is installed in a inland area, it is necessary to remove chlorine ion (Cl$^-$) in the effluent, from a viewpoint of regulations of effluents to rivers. In such a case, in the process of FIG. 3, an electrodialysis apparatus may be provided between a COD-adsorbing tower 189 and a pH-adjusting tank 191 to desalt and concentrate the effluent by means of the electrodialysis apparatus.

Figure 4:
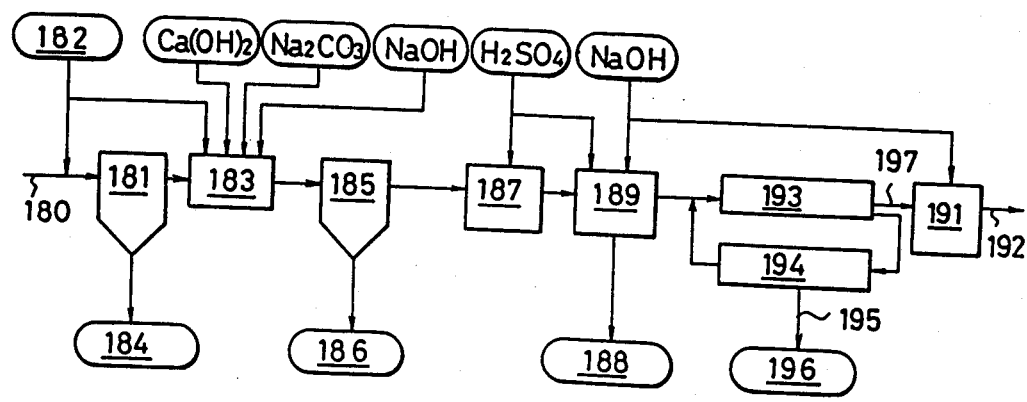
FIG. 4 shows a flow sheet illustrating the effluent treatment where Cl in the effluent is removed by electrodialysis.

FIG. 4 shows a flow sheet wherein an electrodialysis apparatus is used in the effluent-treating apparatus. This apparatus is the same in the steps as far as the COD-adsorbing tank 189, as that of FIG. 3, but two electrodialysis apparatuses 193 and 194 for desalting and concentration are provided after the tank 189 to carry out desalting and concentration, respectively, the resulting desalted water 197 being sent to a pH-adjusting tank 191, and the concentrated slurry 195 concentrated in the apparatus 194 being sent through a concentrated slurry tank 196 to a vaporization-to-dryness step, where solids are recovered, e.g. sodium chloride. The concentrated slurry in the apparatus 193 is fed to the apparatus 194 where it is concentrated to a higher concentration, while the desalted water in the apparatus 194 is recycled to the apparatus 193 where its is desalted to a lower concentration. In this process, since two electrodialysis apparatuses are provided and concentration is carried out in two steps, a higher concentration of concentrated slurry can be obtained to more reduce the energy required for vaporization to dryness of the subsequent step.

The effluent (desalted water) freed from chlorine ion in the electrodialysis apparatuses as described above may be reused in the process, e.g. as the cooling slurry for the cooling step, while the concentrated water may be e.g. vaporized to dryness using boiler flue gas as the heat source, or sprayed inside a duct for boiler flue gas, followed by returning the flue gas containing the resulting solids that is obtained by vaporization to dryness to the front of an upstream electrostatic precipitator to render the desulfurization process a complete closed system.

A main substance among the COD component-forming substances in the effluent is dithionic acid $S_2O_6^{2-}$ formed from a portion of $H_2SO_3^-$ ion contained in the absorbing solution, in the presence of Mn, Fe, etc. As for a process for treating this $S_2O_6^{2-}$, there may be employed a process of adding a strong acid such as sulfuric acid to a blow-down water to adjust the pH to 1.5 or lower, heating to a temperature of 60° C. or higher. Further, another process may be employed wherein $S_2O_6^{2-}$ ions are attached onto a weakly basic ion exchange resin, followed by desorbing them at a pH of 10 or higher, adding a strong acid as described above to adjust the pH to 1.5 or lower, and decomposing it on heating. According the above processes, $S_2O_6^{2-}$ ions contained in the circulating slurries of the absorption tower or the cooling tower or in the effluent may be removed to prevent reduction in the $SO_2$ absorbability of the circulating slurries and also to thereby avoid a secondary environmental pollution. In addition, the flue gas containing $SO_2$ formed by decomposition of $S_2O_6^{2-}$ in the effluent-treating apparatus 4 or 49 may be returned to the feed line of the flue gas 1 to purify the gas.

According to the dust separation system, it is possible to obtain a high grade of gypsum as byproduct, but on the other hand, since solids such as dust, heavy metals, etc. are discharged through the above-mentioned effluent treatment of the cooling step, a portion of the gypsum concentrated slurry may be mixed with a slurry obtained by adding $CaCO_3$ and $Ca(OH)_2$ to the effluent from the cooling tower, to recover a byproduct which is usable as gypsum although its grade is low, and also inhibit discharge of dust, heavy metals, etc. from the effluent-treating apparatus of the cooling step. Thus it is possible to obtain a high grade of gypsum and an optional low grade of gypsum depending on their uses, and also it is possible to inhibit discharge of dust, heavy metals, etc. from the effluent-treating apparatus of the cooling step, and also reduce their amounts discharged.

In the present invention, in the case where it does not matter if dust in the flue gas is mixed in a small amount in gypsum as product, it is possible to feed a slurry, after circulation through the absorption tower, into the cooling tower and further use unreacted $CaCO_3$ contained in the resulting slurry for desulfurization. The flow sheet of this system is shown in FIG. 1-2. As described above, this system is referred to as dust mixing system. In FIG. 1-2, a portion of the slurry having absorbed $SO_x$ in the absorption tower 7 is sent through a line 17 and a valve 19 to a circulating slurry tank 24 of the cooling tower 5. The slurry leaving the cooling tower 5 is passed through a pH-adjusting tank 25, an oxidation tower 29, and a solid-liquid concentration 45 and recovered in the form of gypsum. The filtrate of the solid-liquid concentrator 45 is partly led through a line 47 into an effluent-treating apparatus 49 where it is treated.

In the case where the amount of sulfur oxides in the flue gas is relatively small, the oxidation tower 29 is not used, but air may be blown through a valve 20 by means of a compressive pump 22 into the circulating slurry tank 24 of the cooling tower 5 wherein the slurry is subjected to oxidation treatment. The thus oxidized circulating slurry of the absorption system is fed through a branch line 28 and a valve 30 to the solid-liquid concentrator 45. In this case, the pH of the circulating slurry tank 24 of the cooling tower 5 is preferably adjusted to 5 or lower. In addition, other parts in this figure are the same as those in FIG. 1-1. For example, in this system, coolers 204 and 203 may be similarly provided in the paths of the circulating slurries of the cooling tower 5 and the absorption tower 7, to reduce the slurry temperature to thereby prevent water loss due to vaporization.

Next, the respective equipments employed in the present invention will be described.

Figure 5:
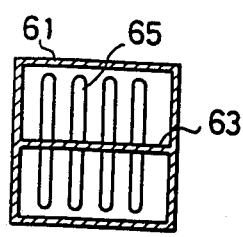
FIG. 5 shows a front cross-sectional view of a heater for reheating the gas treated according to the present invention.
Figure 6:
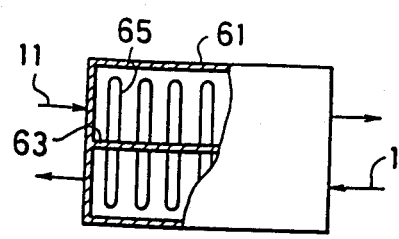
FIG. 6 shows a side cross-sectional view of the above heater.
Figure 7:
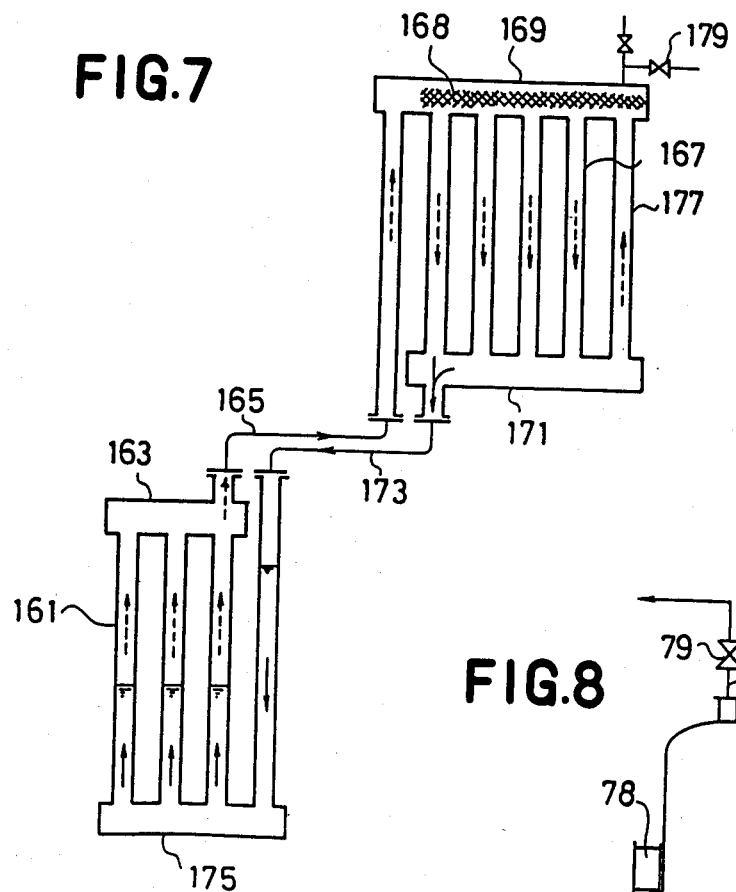
FIG. 7 shows a front cross-sectional view illustrating another embodiment of the heater for gas reheating wherein heat pipes are used.

As for the heater 3 in FIG. 1-1 and FIG. 1-2, although a gas-gas heat exchanger is usable, an indirect heating type heat exchanger as shown in FIG. 5, FIG. 6 and FIG. 7 is preferably used.

Heaters shown in FIG. 5, which side elevation view is shown as FIG. 6, comprise a casing 61, a partition plate 63 dividing the space in the casing in parallel to the gas flow directions 1 and 11 and a plurality of heat pipes 65 penetrating the partition plate 63. The heat pipes 65 contains a condensible heating medium. The partition plate 63 and the heat pipes 65 as tightly fixed to each other so as not to have any gap therebetween.

Low temperature gas 11 after desulfurization is passed through the upper passage formed by the above partition 63, while untreated high temperature gas 1 is passed through the lower passage. This untreated high temperature gas 1 imparts heat to the heat pipes 65, and the medium inside the heat pipes 65 is vaporized by this heat, moves upwards due to the pressure difference inside the pipes, condenses at the upper part of the pipes and imparts the resulting heat of condensation to the low temperature gas 11.

FIG. 7 shows another embodiment of heat pipes employed in a gas heater 3 wherein the heat pipes are separately arranged to form those on the higher temperature side and those on the lower temperature side. In this figure, the heat pipes on the higher temperature side 161 are connected via an upper header 163 located above the pipes and a connecting pipe (pipe for ascending vapor) 165, to an upper header 169 located above the heating pipes on the lower temperature side 167, located above the header 163. On the other hand, a lower header 171 below the heat pipes 167 are connected via a connecting pipe (pipe for descending liquid) 173, to a lower header 175 below the heating pipes on the higher temperature side 161. The header 169 is filled with a filler 168 wrapped by a wire net for promoting the condensation of steam. The heat pipes on the higher temperature side 161 and those on the lower temperature side 167 are separately arranged in the duct through which the higher temperature gas passes and a duct through which the lower temperature gas passes, respectively. A condensible liquid such as water is sealed in the heat pipes on the higher temperature side 161, while keeping a definite level as shown in the Figure. This liquid is heated and vaporized by the higher temperature gas passing through the outside of the pipes. The resulting vapor passes through the connecting pipe 165 and moves to the heat pipes on the lower temperature side 167 wherein the vapor is cooled and condensed by the lower temperature gas passing through the outside of the pipes to effect heat exchange. The resulting condensate is collected in the header 171 and then returned via the liquid-descending pipe 173 to the lower header 175 below the heat pipes on the higher temperature side 161. While the above vaporization and condensation are repeated, heat exchange is carried out between the gas flowing through the duct on the higher temperature side and that on the lower temperature side. In addition, a heat pipe 177 among those on the lower temperature side constitutes a gas-separating pipe from which a non-condensible gas is discharged via the upper header 169 and then a valve 179.

As for the above-mentioned separation-type heat pipes, since the duct on the higher temperature side are separately arranged, heat transfer for a long distance becomes possible. Further, it is unnecessary to provide a complicated piping so that ducts containing heat pipes may be adjacent to each other, whereby it is possible to reduce pressure drop due to the ducts. Further, since the pipes on the higher temperature side and those on the lower temperature side are separated, and placed independently from each other, it is easy to choice the materials and shapes of the respective pipes. Their maintenance becames also easy.

In the FIGS. 5, 6 and 7, if there is no fear of clogging due to dust, employment of finned heat pipes can further improve the heat transfer efficiency.

According to the embodiments of the above figures using heat pipes, since two kinds gas flows are completely partitioned, there is neither gas leakage as observed in a conventional Ljungstroem type heat-exchanger, nor reduction in the percentage desulfurization of desulfurization apparatus. Thus it is possible to make the clean exhaust gas passing through the heat exchanger not to be contaminated by the dusts contained in the flue gas to prevent the exhaust gas from re-pollution. Further, since the percentage heat-exchange is very high in heat pipes, it is possible to make the whole of the heat-exchanger smaller. Furthermore, when the heat pipes are roughly arranged, it is also possible to prevent dust, etc. contained in the flue gas from adhesion; thus it is possible to reduce the draft loss and the running cost of desulfurization apparatus. The cleaned gas leaving the absorption tower 7 is reheated in the heater 3 utilizing the waste heat, without employing an external heat source such as fuels, and it is possible to prevent white smoke from discharging from stacks. Further, it is possible to prevent corrosion from occuring in the stacks and to make it easy for the gas to be diffused from the stacks.

Figure 8:
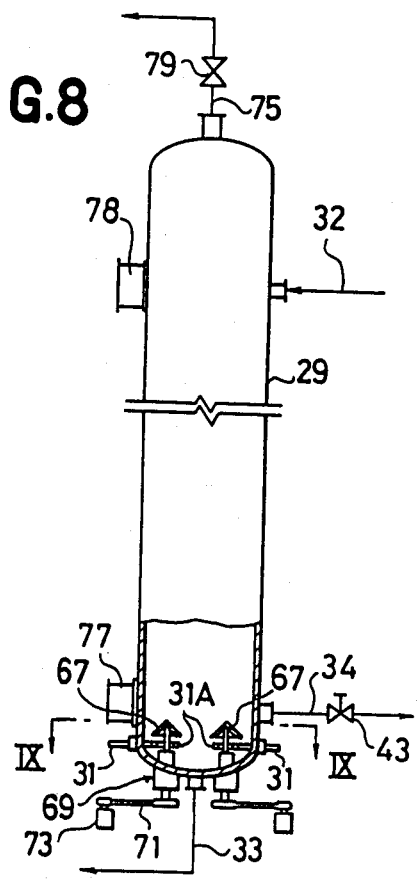
FIG. 8 shows a cross-sectional view partly cut away illustrating an embodiment of the oxidation tower used in the process of the present invention.
Figure 9:
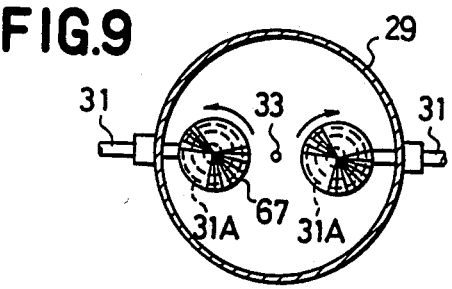
FIG. 9 shows a cross-sectional view of the above oxidation tower as viewed in the direction of arrow marks along the line 1X—1X of FIG. 8.

Preferable embodiments of the oxidation tower 29 are shown in FIGS. 8 and 9. The bottom part of the oxidation tower 29 is provided with atomizers 69 each having a conical rotor 67, and the rotating shaft of the rotor 67 is connected to a motor 73 through a pulley and a belt 71 outside the tower. Just below the rotor 67 of the respective atomizers 69 is provided a ring header having nozzles 31A opened toward the rotor, and compressed air is supplied through an air-introducing line 31 into the nozzles 31A. A line for discharging oxidized gypsum slurry 34 is also provided on the side wall of the lower part of the tower. On the other hand, the upper part of the tower is provided with a raw material slurry-feeding line 32 extending from the pH-control tank 25, and at the top part of the tower is provided a gas-exhaust line 75. The line 33 is a drainage line. Numerals 77 and 78 indicate manholes, and 79, a valve for gas-exhaust from the top part of the tower.

In the oxidation tower having the above construction, the slurry containing $CaSO_3$ and $Ca(HSO_3)_2$ is fed via the line 32 at the upper part of the tower, while compressed air is introduced through the nozzles 31A at the lower part of the tower. The air becomes fine air bubbles around the rotors 67 by means of the rotating power thereof, then the bubbles ascend inside the tower while they are uniformly dispersed and contacted with the slurry to oxidize $CaSO_3$ and $Ca(HSO_3)_2$ contained therein to form gypsum ($CaSO_4.2H_2O$).

In the above operation, although the pressure inside the tower may be of an atmospheric one, it is desirable to raise the pressure inside the tower up to about 1.5 atmosphere or higher (preferably about 2 atmospheres) to promote the oxidation reaction. Further, it is also desirable to make the quantity of the compressed air fed via the line 31, about 1.5 times or more the theoretical air quantity required to oxidize $CaSO_3$ and $Ca(HSO_3)_2$. Exhaust gas of the oxidation tower is discharged from the top part of the tower via a line 75 and a valve 79 to the absorption tower, while the slurry containing gypsum is discharged through the line 34 at the lower part of the tower, and further sent via a valve 43 to a solid-liquid separator 45. When the slurry is discharged through the line 34, the valve 43 is adjusted so that the liquid level of the slurry in the oxidation tower can be kept constant.

Figure 10:
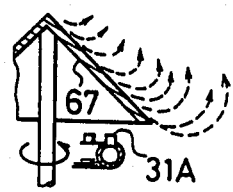
FIG. 10 shows a partial cross-sectional view illustrating details of a rotor for generating fine bubbles used in the oxidation tower of FIG. 6.

By making the shape of the rotor 67 of the atomizer 69 conical, air bubbles are uniformly dispersed by centrifugal force in the radial direction of the tower by the medium of the slurry flowing along the surface of the rotor, as shown by the broken lines each having an arrow mark in FIG. 10, to effect a good gas-liquid contact. Further, since the end part of the rotor is covered by air bubbles, its resistance is reduced and its rotaing power is also reduced. Furthermore, since the rotor 67 has no hole, its structure becomes simple and nevertheless its performance is superior. In addition, the shape of the rotors 67 may be elliptically conical, version-conical, etc. besides the conical shape as shown in the figure (e.g. having a vertical angle of 90°).

Figure 11:
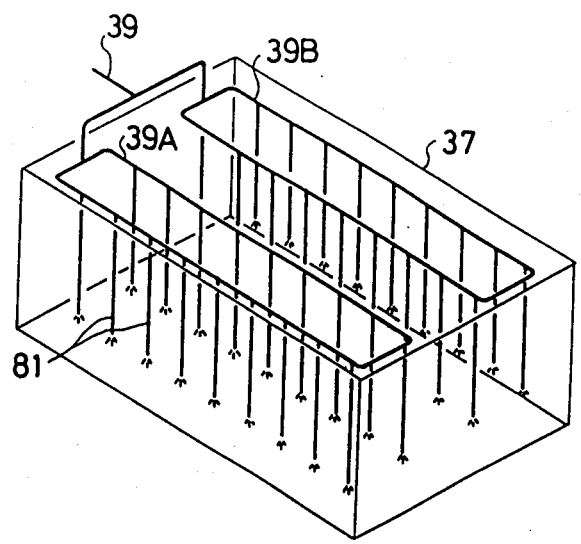
FIG. 11 shows an appearance view of an urgent blow tank attached to the oxidation tower.

The details of the urgent blow-down tank 37 connected to the oxidation tower 29 in the present invention are shown in FIG. 11. Referring to this figure, at the upper part of the tank 37 are provided main pipes 39A, 39B each connected to a mother pipe 39, and from the respective main pipes are branched a plurality of vertical pipings 81 for slurry agitation so that their ends are apart from the bottom part of the vessel with a slight clearance. Compressed air is passed through pipes 39, 39A, 39B and vertical pipings 81 and spouted from the tip ends of the pipings 81 toward the bottom part of the tank 37. As the fluid to be spouted, air may be replaced by the slurry itself. The slurry inside the tank is vigorously agitated by blowing such air or the slurry itself into the slurry. Even if the slurry flows back into the vertical pipings 81, its resistance is very small, and when the air feed is stopped, the solids contained in the slurry naturally settle toward the outside of the pipings; hence no clogging occurs. Thus even when the quantity of air fed or the pressure of the slurry fed is not increased, it is possible to carry out a very effective agitation. Further, since it is not necessary for the pipings to be provided with small holes or nozzles, the apparatus has a simple construction and is economical.

If the slurry temperature is increased by the oxidation reaction of calcium sulfite inside the oxidation tower 29 to raise a problem of corrosion of the respective equipments and pipings, then it is possible to inhibit the temperature rise by supplying water through the line 83 (FIGS. 1-1 and 1-2) into the oxidation tower 29 to thereby increase the water content in the slurry (e.g. to 92 to 94% by weight). As for the supplement water through the line 83, it is possible to introduce the filtrate water from the centrigufal separator 53 via a branch from the line 61 and a valve 85.

In the present invention, as for the gypsum concentration vessel (solid-liquid separator) 45 for separating gypsum from the gypsum-containing slurry, an lake-type thickner or a liquid cyclone may be preferably employed. With respect of the centrifugal separator 53 arranged downstreams of the solid-liquid separator 45, if it is aimed to obtain a good quality gypsum as the byproduct, it is desired to severely and accurately detect and control the concentration and quantity of the slurry fed to the centrifugal separator 53 which is disposed after the solid-liquid separator 45 (e.g. to a range from 15 to 25% by weight).

Figure 12:
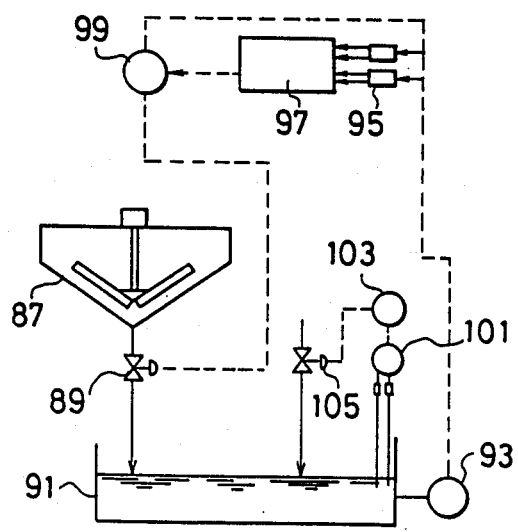
FIG. 12 shows an illustrative view of the method for adjusting the concentration of the gypsum slurry obtained in a solid-liquid separator in the process of the present invention.

FIG. 12 shows a view illustrating a method for controlling the quantity and concentration of slurry in the case where a thickner 87 is employed as the solid-liquid separator 45.

The gypsum slurry is concentrated by settling in the thickner 87 and at the same time the concentrated slurry is discharged via a control valve 89 into a concentrated slurry tank 91. In this case, as for the method of discharging the slurry into the slurry tank 91, it is desirable to employ a system wherein the level of the slurry in the slurry tank 91 is detected by a level transmitter 93 and signals of open or closed are transmitted to the above control valve 89 by a monitor switch 95. The duration of the above open or closed of the control valve 89 can be optionally adjusted by a timer provided in a pulsing circuit 97 which receives the signals from the level transmitter 93 and the monitor switch 95. Namely, the pulsing circuit 97 corresponds to a circuit for carrying out the interlock of the control valve 89, etc.; thus the duration of open or closed of the control valve 89 can be optionally controlled by setting the timer. Further to the pulsing circuit 97 is connected a level-controller 99, which allows the open or close control of the valve 89 to be optionally changed either to an automatic control or to a manual one. Namely, when the controller 99 is set to an automatic control, it is possible to automatically open or close the control valve 89 repeating "open" or "closed" thereof by the signals through the level controller 99 and the above pulsing circuit 97 actuated by the signals transmitted from the monitor switch 95 and the level transmitter 93.

On the other hand, the slurry concentration is detected by a concentration detector 101 dipped in the slurry tank 91; the concentration signal dispatched from this detector 101 enters a slurry concentration controller 103; and this controller 103 controls the open or close degree of a diluted water controller 105 provided in the passageway for feeding diluted water to the slurry tank 91. That is, the quantity of diluted water is increased or decreased by controlling the open or close degree of the control valve 105.

In the dust separation system of the present invention (FIG. 1-1), in order to subject the slurry of the absorption tower 7 to oxidation treatment to thereby obtain gypsum, without passing the slurry through the pH-adjusting tank 25 and the oxidation tower 29, a process may be employed wherein a portion of the flue gas at the exit of the cooling tower 5, freed from dust and acidic gases is sucked by a fan 201, followed by contacting it with the slurry in a reactor 202 to neutralize unreacted $CaCO_3$ with $SO_x$ in the flue gas and also oxidize calcium sulfite formed herein and in the adsorption tower 7 by oxygen in the flue gas. According to this system, excess $CaCO_3$ which has been required for increasing the percentage $SO_2$ removal, is nentralized by $SO_2$ in the flue gas, and also since the flue gas is returned through a line 206 to the absorption tower 7, it is unnecessary to neutralize excess $CaCO_3$ with sulfuric acid in th pH-adjusting tank 25 to reduce amount of sulfuric acid for use to a large extent. Further, in the case where the oxygen concentration in the flue gas is low, air may be partly mixed with the flue gas to increase its concentration to thereby render the oxidation rate adequate.

Figure 13:
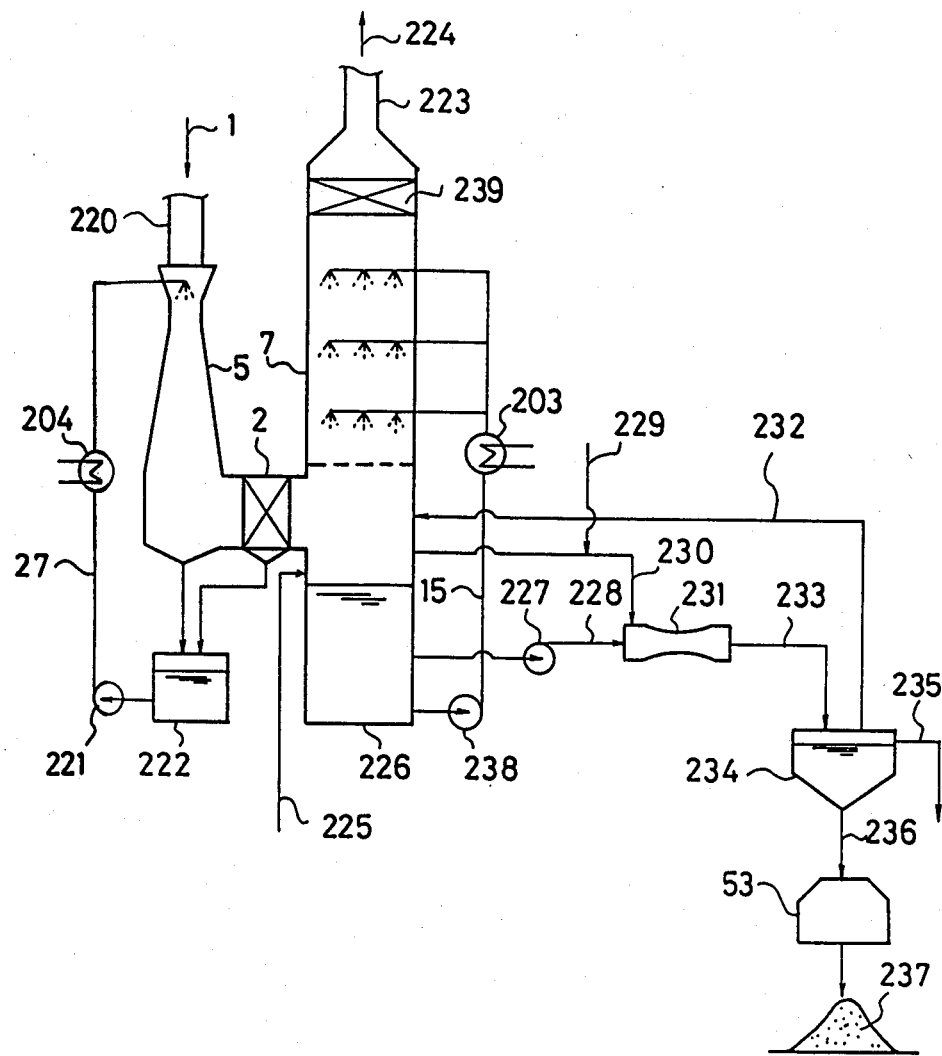
FIG. 13 shows a flow sheet illustrating the case where an ejector is used when the pH adjustment and oxidation of slurry are carried out using the exit gas from the cooling tower in the dust separation system.
Figure 14:
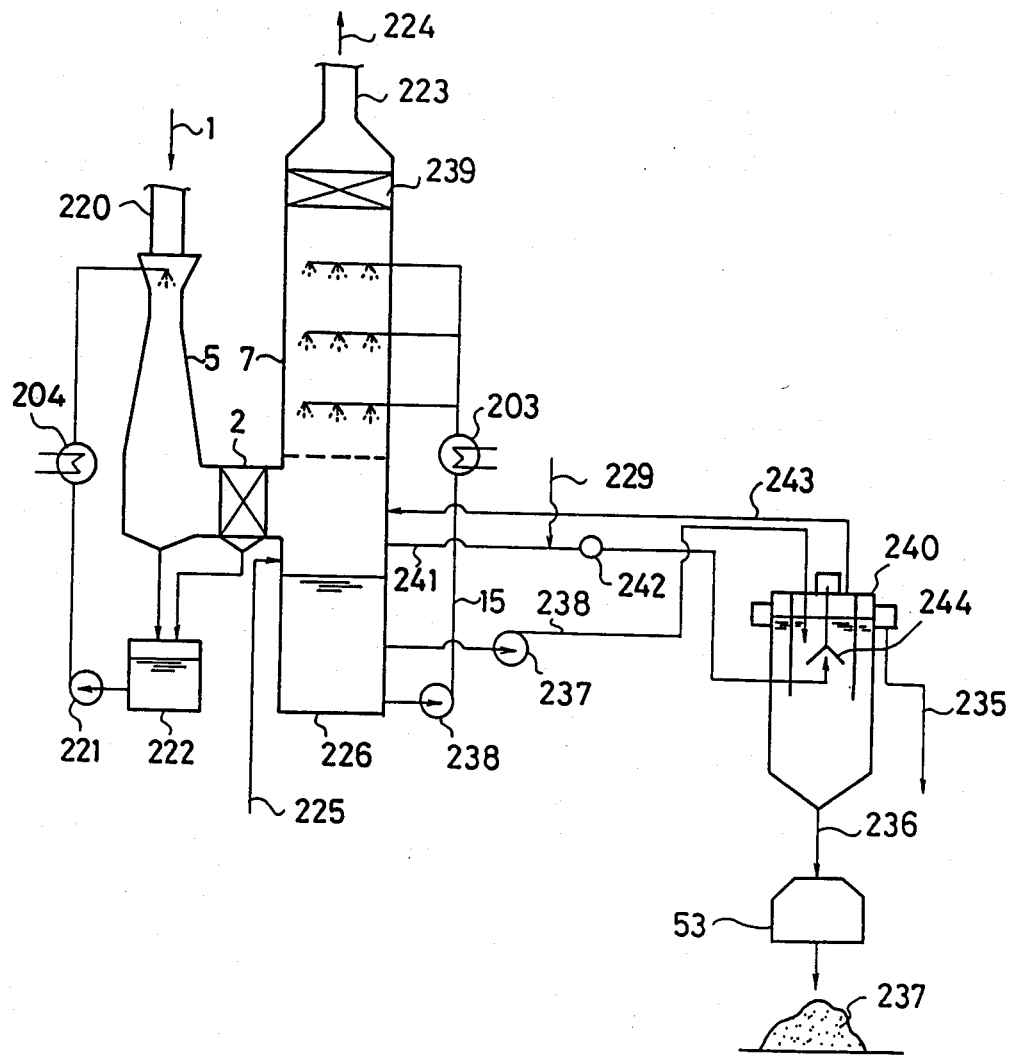
FIG. 14 shows a flow sheet illustrating the case where a reactor provided with an atomizer is used in place of the ejector of FIG. 13.

Embodiments in the case where the pH adjustment and oxidation of a slurry containing $CaSO_3$, $Ca(HSO_3)_2$ sent from the absorption tower 7 are carried out with the flue gas at the exit of the cooling tower 5, are shown in FIG. 13 and FIG. 14. FIG. 13 shows a case where an ejector is used as the reactor 202 (FIG. 1-1), and FIG. 14 shows a case where a reactor having an atomizer with a generating bubbles is similarly used as the reactor 202.

Referring to FIG. 13, the flue gas 1 from e.g. a boiler is led through an inlet duct 220 into the cooling tower 5 where it is dedusted and cooled, and then freed from fly mist by a mist eliminator 2 and further led into the absorption tower 7 where sulfur oxides in the flue gas 1 are absorbed and removed by an absorber slurry 225. A purified gas 224 is exhausted from the top duct 223 of the absorption tower 7. The absorber having absorbed sulfur oxides to form sulfites in the absorption tower 7 and the slurry circulating tank 226 thereof, and a portion of the sulfites is oxidized by oxygen in the flue gas to form gypsum. A portion of the absorber remains unreacted in the slurry. This slurry is elevated in the pressure by means of a bleed pump 227 and led through a duct 228 into an ejector 231. The slurry fed into the ejector 231, when passing through it, is sucked in by the gas 230 after dedusting in the cooling tower. At that time, unreacted absorber in the reaction slurry reacts with $SO_2$ in the gas to form sulfites, which are oxidized together with the sulfites formed in the oxidation step by $O_2$ in the gas to form sulfates. Since the oxidizability at that time is much superior to the air oxidation by means of an atomizer in the oxidation tower, the amount of oxygen in the flue gas may be sufficient. However, in the case where the oxygen concentration in the flue gas is low, or in the case where it is necessary to further elevate the oxidation rate, air may be blown through a line 229 into a portion of the flue gas to elevate the oxidation rate. In this figure, numeral 221 represents a circulating pump for the slurry of the cooling tower and 239 represents a demistor provided at the exit of the absorption tower 7.

The slurry oxidized in the ejector 231 and containing the resulting sulfate formed is sent through a duct 233 into a thickner 234 where the slurry is concentrated, and the resulting concentrated slurry is sent through an introducing pipe 236 to a dehydrator 53 (such as centrifugal separator) where it is dehydrated and recovered in the form of sulfate particles (gypsum) 237.

The above thickner 234 is preferred to take a structure wherein solid-liquid separation and gas-liquid separation are carried out at the same time. If the gas separated in the thickner 234 is returned through a duct 232 to the absorption tower 7, it is possible to simplify the system without requiring any particular treatment. The filtrate water in the thickner 234 is withdrawn through a duct 235 and recycled into the original apparatus and used therein.

According to the embodiment of FIG. 13, formation of sulfites from the absorber slurry and pH adjustment of the slurry and also its oxidation into sulfate are carried out in the ejector 231 by $SO_2$ and $O_2$ contained in the flue gas, hence a tank for pH adjustment with sulfuric acid and an oxidation tower having an atomizer are unnecessary whereby it is possible to reduce utilities and simplify equipments. Further, it is possible to subject the reacted and oxidized slurry in the ejector to solid-liquid separation to thereby recover a good quality of gypsum as byproduct. Furthermore, it is possible to subject the entrained gas from the ejector to gas-liquid separation in the thickner 234 and return to the absorption tower 7 to thereby make any particular gas-treating apparatus unnecessary and hence rationalize the whole of the system.

Next, FIG. 14 shows an example wherein an atomizer type reactor having an umbrella type rotor is used in place of the ejector 231 in the embodiment of FIG. 13. In FIG. 14, the slurry of the absorption tower 7 containing unreacted absorber is withdrawn through a line 238 in an amount corresponding to the amount of sulfur oxides absorbed, and then fed to a reactor 240. In this case, the line 238 may be provided with a control valve whose opening degree is adjusted correspondingly to the detected valve of $SO_2$ absorbed in the absorption step. On the other hand, a portion of the flue gas after dedusted and cooled in the cooling tower and then led into the absorption tower 7 is led through a line 241 and a fan 242 into the reactor 240. In this reactor 240, $SO_2$ in the gas reacts with unreacted absorber in the reaction slurry to form sulfites, which are oxidized together with sulfites formed in the absorption step, by $O_2$ contained in the flue gas to form gypsum. The reactor 240 is so constructed that the gas can be absorbed below an umbrella type rotor 244 so that solid-liquid separation and gas-liquid separation can be carried out at the same time, to effect gas-liquid contact. According to such a structure, it is possible to return the separated gas through a duct 243 into the absorption tower 7: hence it is possible to simplify the system without requiring any particular gas treatment. In addition, the filtrate water may be circulated through a duct 235 to the absorption step and reused there. In the case where the $O_2$ concentration in the flue gas is low or in the case where it is necessary to further elevate the oxidation rate, air may be blown in the flue gas through a line 229.

According to the above embodiment, since the absorber solution is subjected to reaction and oxidation by means of $SO_2$ and $O_2$ contained in the flue gas after cooling and dedusting, to effect the pH adjustment of the solution containing sulfites formed therein and its oxidation into sulfate, it is possible to not only reduce an amount of chemicals to be used but also simplify the equipment. Further, the slurry reacted and oxidized in the reactor 240 may be subjected to solid-liquid separation in a thickner part at the bottom part of the reactor or in separately located thickner to recover a good quality of gypsum as byproduct. Further, the gas after reacting in the reactor 240 may be subjected to gas-liquid separation and returned to the absorption tower 7 to thereby rationalize the whole of the system without requiring any particular gas-treating apparatus. Furthermore, since the absorber slurry of the absorption tower 7 is not totally reacted and oxidized, but only a portion of the slurry withdrawn in an amount corresponding to the amount of $SO_2$ absorbed in the absorption tower is reacted and oxidized, it is possible to further enhance the utilities of the apparatus.

In the dust separation system of the present invention, usually the cooling tower 5 and the absorption tower 7 are separately constructed and connected by a connecting duct 2 (see FIG. 13 and FIG. 14), and further a mist eliminator is provided in the duct. However, if it is desired to render the apparatus compact, it is possible to be substituted for a single tower provided with both of these functions.

Figure 15:
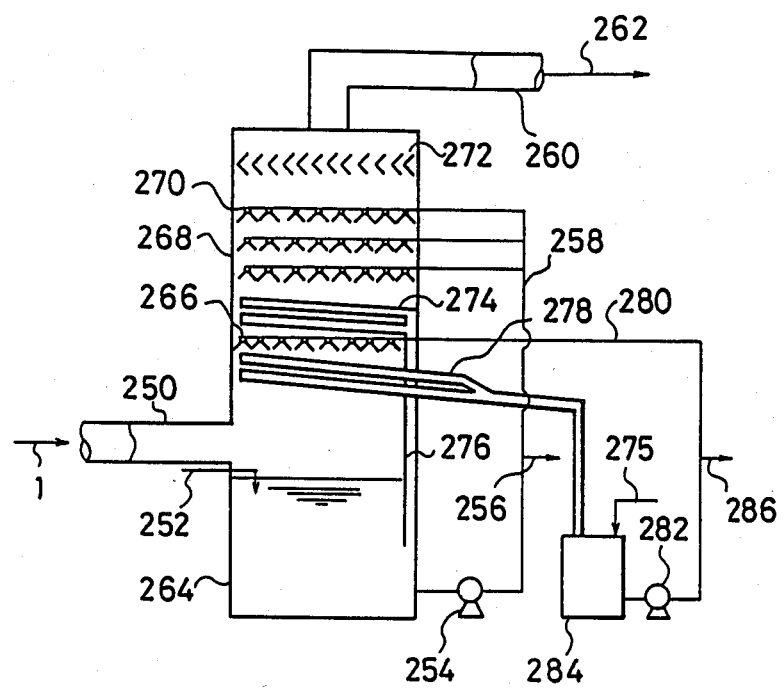
FIG. 15 shows an illustrative view of the structure of a reaction apparatus wherein the cooling step and the absorption step are carried out in a single tower.

FIG. 15 shows an embodiment of a gas-liquid contact apparatus wherein the cooling step and the absorption step are carried out in a single tower. This apparatus consists mainly of a body of tower 268 having an inlet duct 250 of flue gas 1 at the lower part of the tower and an exit duct 260 of treated gas 262 at the top part of the tower; a circulating absorber slurry tank 264 provided integrally with the body at the lower part thereof; spray nozzles 270 for the absorber slurry, provided at the upper part inside the tower; a piping system 258 through which the slurry stored in the tank 264 is circulated via a pump 254 to the spray nozzles 270 for the absorbing solution; a receiver 274 provided below the spray nozzles 270 and for receiving the the absorber slurry scattered from the spray nozzles 270; a recovery duct 276 for causing the slurry of the receiver 274 to flow down to the slurry circulating tank 264; cooling water spray nozzles 266 provided at the upstream of the flue gas introduced from the flue gas inlet duct 250 and below the receiver 274 for receiving the absorbing solution; a receiver 278 provided below the nozzles 266 and for receiving cooling water scattered from the spray nozzles; a circulating cooling water tank 284 for once storing the cooling water of the receiver; and a piping system 280 through which the cooling water in the tank 284 is circulated through a pump 282 to the cooling water spray nozzles 266. In addition, numeral 252 represents a feeding line for the absorber slurry; 256, a withdrawing line for the slurry; 272, a demister provided at the top part of the tower; 275, a piping for feeding cooling water; and 286, a withdrawing piping therefor.

Figure 16:
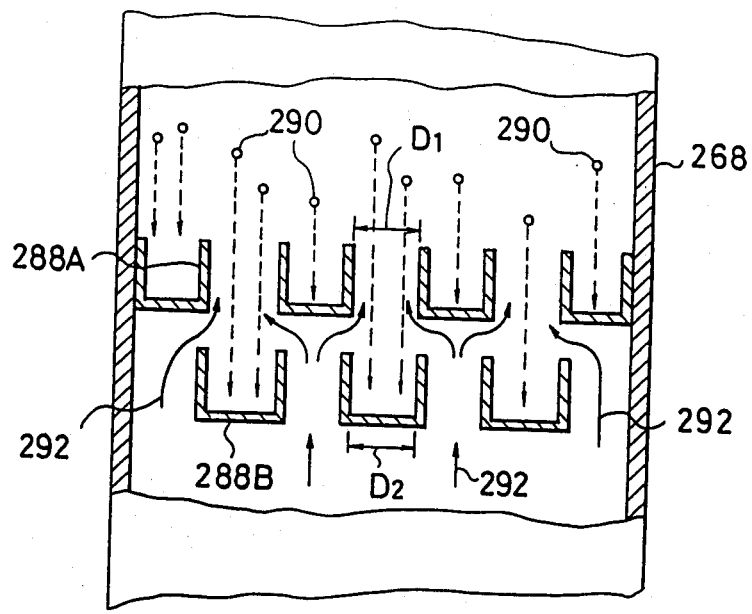
FIG. 16 shows a cross-sectional view of the receiver part in FIG. 15.

FIG. 16 shows the cross-sectional view of the receivers for the absorber solution or the cooling water (274 or 278) shown in FIG. 15. The receiver consists of slanted troughs 288A, 288B having a cross-section of U letter form and arranged in zigzag configuration and in two stages. The troughs are so arranged that the distance D, between the respective upper stage troughs is smaller than the opening width $D_2$ of the lower stage troughs, and liquid drops 290 which drop from above the troughs pass through between the upper stage troughs 288A, but they are received by the lower stage troughs 288B. Further, the gap between the upper stage troughs 288A and the lower stage troughs 288B is determined so that the resistance to the flow path of the gas 292 does not become excessive and also the liquid drops 290 do not drop erroneously outside the troughs. The liquid drops which dropped on the troughs 288A or 288B flow in the slanted direction of the troughs, i.e. in the right direction on the paper surface, of the receivers 274 or 278 of FIG. 15, and are recovered in the tanks 264 or 284 as described above.

In the apparatus (FIG. 15) as constructed above, the flue gas 1 is led through the duct 250 into the absorption tower 268 where the gas is cooled and dedusted by liquid drops of cooling water sprayed from the upstream spray nozzles 266, and the liquid is received by the receiver 278 and recovered without dropping downwards. This liquid is collected into a separately provided tank 284, and returned through the pump 282 to the spray nozzles 266 for recycle and reuse. When a receiver by the use of such a combination of troughs is used, it is possible to reduce the proportion of downwards dropping water within 5% or less.

The thus cooled and dedusted flue gas is contacted with liquid drops sprayed from the spray nozzle 270 part of the tower, located at the upper end to absorb $SO_2$ in the gas. The resulting liquid drops are collected in the receiver 274 and recovered through the recovery duct 276 into the tank 264 at the lower part of the tower. The thus recovered liquid is returned by the pump 254 for circulating the absorber solution to the upper part of the tower through piping 258, for recycle and reuse. The flue gas free from $SO_2$ is then subjected to removing fly mist by the demister 272 at the top part of the tower and exhausted from a flue 260 as a clean gas 262. The absorber slurry is fed through a piping 252, withdrawn through a piping 256 in an amount corresponding to the amount of $SO_2$ absorbed, and passed through the oxidation step to form gypsum as byproduct, which is then recovered. On the other hand, water for cooling and dedusting is fed through a piping 275, withdrawn through a piping 286 in an amount corresponding to the dust concentration in a tank 284, and separately treated.

According to the above embodiment, since a single tower is provided with functions of cooling and dedusting of flue gas and absorption and removal of $SO_2$, the apparatus becomes compact and hence a small installation area may be sufficient. Further since cooling and dedusting are completely separated from desulfurization, dust and impurities such as HCl, HF, etc. in the flue gas do not mix in the absorber solution to prevent the performance reduction of the absorber solution and enhance the quality of gypsum as byproduct. Furthermore, since the receivers for the cooling liquid or the absorber solution are provided inside the tower, the dispersibility of the flue gas is superior, the effectiveness of gas-liquid contact is improved and the effectiveness of improving the percentage desulfurization is also exhibited.

In the dust mixing system (FIG. 1-2), in the case where the slurry in the cooling tower 5 is subjected to oxidation treatment without passing through the pH-control tank 25 and the oxidation tower 29, the slurry in the cooling tower 5 is circulated through the circulating tank 24 and the line 27, and the pH of the slurry is reduced down to 5 to less. In such a state, the amount of unreacted limestone is reduced, and $CaSO_3.\frac{1}{2}H_2O$ formed according to the above equation (1) by $SO_2$ absorption in the slurry in the cooling tower 5, is consumed as shown in the above equation (2) to form $Ca(HSO_3)_2$ which is easily oxidized. When air is blown by means of a compressor 22 through a valve 20 into the slurry in such a state, oxidation of $Ca(HSO_3)_2$ with air is carried out e.g. according to the above equation (3) or (4) to form gypsum ($CaSO_4.2H_2O$).

Figure 17:
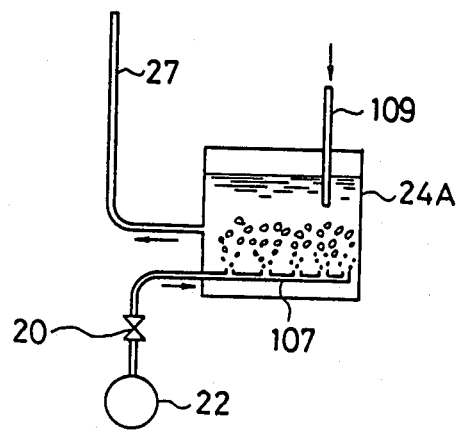
FIG. 17 shows a cross-sectional view of a slurry tank employed in the case where calcium sulfite is oxidized in the circulating slurry tank of the cooling tower in the process of the present invention.

A preferable embodiment of a tank in the case where oxidation is carried out in the slurry tank 24 is shown in FIG. 17. In this figure, a tank 24A is provided with an air piping 107 having a plurality of nozzles, at the bottom part thereof, a slurry-introducting pipe 109 led from the cooling tower 5 at one end of the tank 24A and a slurry-discharging pipe 27 at the other end thereof. The piping 107 for air blow-in may be replaced by a piping having downwards directed branches like the piping system of 39A and 81 in FIG. 8.

When the pH of the circulating slurry of the cooling tower 5 is adjusted to 5 or less, preferably 4 to 3, gypsum is liable to be formed; hence even when air is not blown in by means of the compressor 22, it is possible to form gypsum from the flue gas by means of air absorbed in the slurry. In this case, since the oxygen partial pressure in the flue gas is low, gypsum having a larger particle size is formed.

Figure 18:
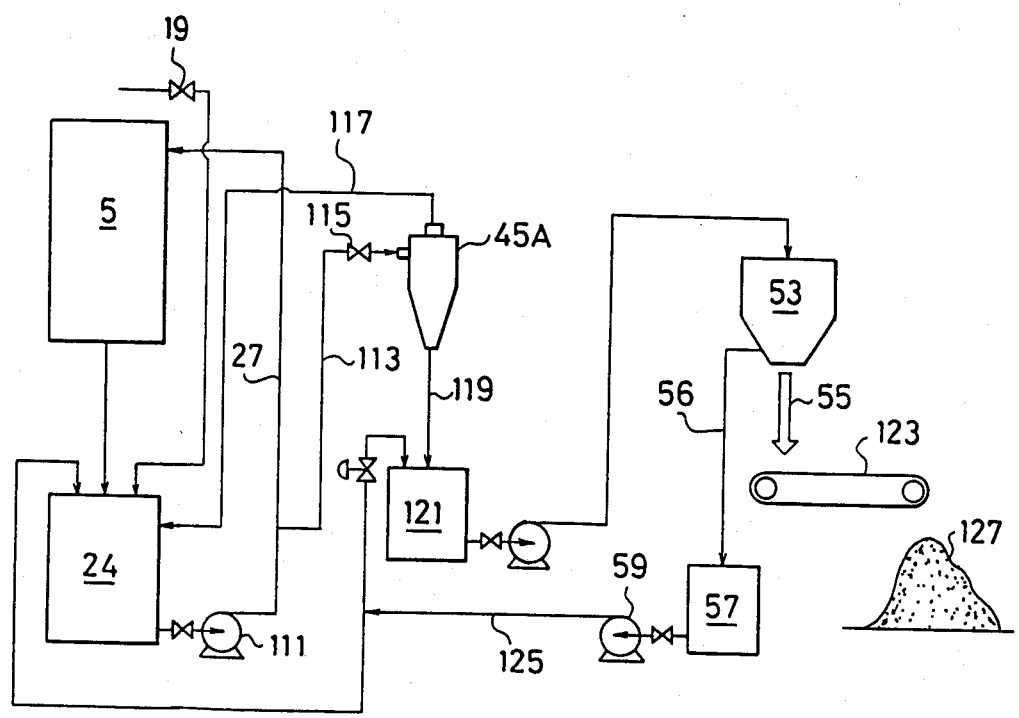
FIG. 18 shows an illustrative view of the gypsum recovery process in the case where a liquid cyclone is used as the concentrator in the process of the present invention.

A process of oxidizing calcium sulfite formed inside the slurry circulating system of the cooling tower without employing the oxidation tower 29 or the compressor 22, and separating gypsum by the use of a liquid cyclone, according to the dust mixing system, will be illustrated referring to FIG. 18. Between the cooling tower 5 and the slurry tank 24 is circulated a limestone-containing slurry, through the circulating line 27 by which the tower 5 is connected to the tank 24, by means of a pump 111. As $SO_2$ contained in the flue gas is absorbed in the slurry, the pH of the slurry is reduced to bring about conditions under which gypsum is liable to be formed; thus calcium sulfite formed in the slurry is oxidized by oxygen contained in the slurry to form gypsum. A portion of the circulating slurry containing gypsum is withdrawn through a line 113 and led into a liquid cyclone 45A where gypsum is separated. In this case, the size of the limestone as absorber is 325 meshes 100% pass (44μ or smaller), for example, and the size of calcium sulfite is smaller than the limestone, and also the size of gypsum is larger tha the limestone; hence the conditions in the liquid cyclone 45A are controlled so that sizing is carried out around about 50μ. The flow control of the slurry containing gypsum in the line 113 is carried out correspondingly to the change in the amount of flue gas to be treated by controlling a flow control valve 115 located at the inlet of the cyclone 45A. Further, the liquor after gypsum separation, in which limestone and calcium sulfite are contained in admixture, is returned through an overflow piping 117 into the tank 24. The gypsum slurry separated by the cyclone 45A is withdrawn through an underflow piping 119 and stored in the slurry tank 121. When the amount of the gypsum slurry inside the tank 121 has reached a definite amount, the gypsum slurry is sent to the centrifugal separator 53 where the slurry is dehydrated to recover gypsum having a surface water content of 10% or less. This gypsum 127 is carried by a belt conveyer 123 and stored at a separate place. In addition, the discharge water from the centrifugal separator 53 flows through line 56 and is stored in the discharge water tank 57 and returned into the tanks 24 and 121 through a discharge water piping 125 and pump 56 to control the concentrations of the circulating slurry of the cooling tower and the gypsum slurry. By repeating such a cycle, gypsum is formed.

On the other hand, in the case where the gypsum slurry is obtained through the pH control tank 25 and the oxidation tower 29 (FIG. 1-1) and is subjected to solid-liquid separation by the liquid cyclone, unreacted limestone particles are not contained so much in the slurry; hence a liquor containing gypsum of smaller particle sizes is discharged from the overflow piping of the cyclone, while a slurry containing gypsum of smaller particle sizes, discharged from the upper part of the liquid cyclone is returned to the absorption tower 7 (FIG. 1-1), the gypsum concentration in the absorber solution in the absorption tower is thereby increased, and also, gypsum freshly formed in the absorption step crystallizes on the above-mentioned fine particle gypsum contained in the absorber solution; hence scale problems brought about by precipitation of gypsum on the inner wall, etc. are prevented, and at the same time, gypsum of larger particle sizes is obtained due to the crystallization of gypsum on the above-mentioned fine particle gypsum.

The concentration of the gypsum slurry fed to the centrifugal separator 53 may be preferably controlled to be in the range of 15 to 25% by weight from standpoints of a stable operation of the centrifugal separator and the grade of gypsum to be obtained.

Figure 19:
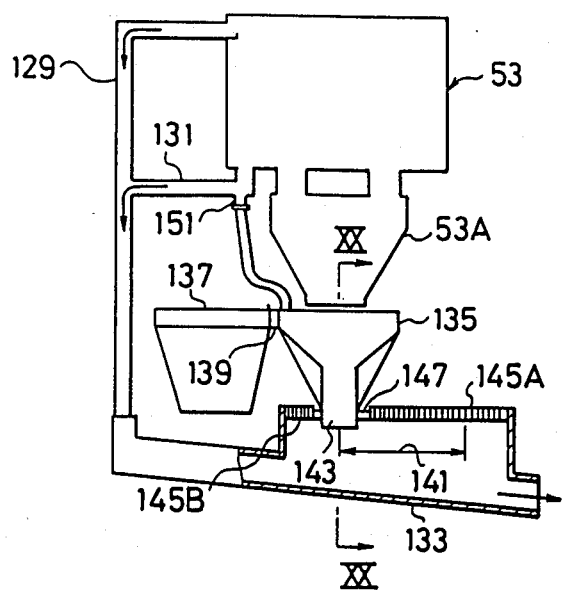
FIG. 19 shows a schematic cross-sectional view of a centrifugal separator used in the process of the present invention.
Figure 20:
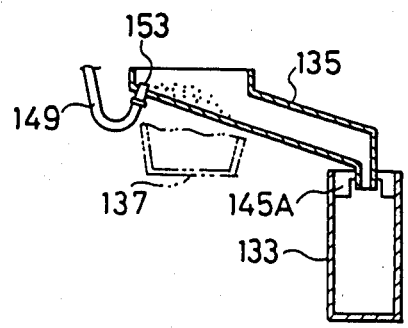
FIG. 20 shows a cross-sectional view of the above separator as viewed in the direction of arrow marks along the XX—XX line of FIG. 19.

FIGS. 19 and 20 show preferable embodiments of the centrifugal separator 53 employed in the present invention. In these figures, the centrifugal separator 53 is provided with an overflow pipe 129, a discharge water pipe 131 and discharge water duct 133 connected to these pipes. On the other hand, just below the centrifugal separator 53 are arranged a discharge water hopper 135 as a receiving dish for receiving the discharge water at the time of the liquor feed as well as at the time of the dehydration, and a hopper 137 as a receiving dish for receiving the dehydrated material at the time of completion of the dehydration, and these hoppers are connected through a connecting part 139. The hoppers 135 and 137 are devised so as to be adaptable to the respective operations thereof, concretely so as to be able to reciprocate between a reciprocating section 141, and the exit 143 of the discharge water hopper 135 reciprocates between the section of the opening part of the discharge water duct 133. This opening part of the discharge water duct 133, opened for the reciprocating motion of the exit 143 of the discharge water hopper 135 is provided with bellows 145A, 145B fixed by means of fittings 147 so as not to harm the function of the exit 143, to thereby prevent vapor leakage.

According to such a construction, the discharge water duct 133 has no opening part and is always closed in spite of the reciprocating motion of the discharge water hopper 135 and the hopper 137; hence there occurs no vapor leakage at the time of discharge of of overflow water and dehydration discharge water, and at the time of the liquor feed. In such a manner, moisture leakage around the centrifugal separator is prevented and incomplete actuation of electric instruments due to adhesion of dust as well as resting of equipments can be preventee, and also wetting of dehydrated material (gypsum) due to dropping thereon of condensed steam is prevented.

A portion of the dehydration discharged water from the centrifugal separator 53 is passed through a hose 149 fixed to a hose-fixing adaptor 151 of the discharge water pipe 131, and spouted from a nozzle 153 located at the bottom part of the discharge water hopper 135 to wash away residue adhered around the bottom part. The dehydration discharge water from the centrifugal separator is continuously fed during the operation; hence washing of the hopper 135 is also continuously carried out.

Figure 21:
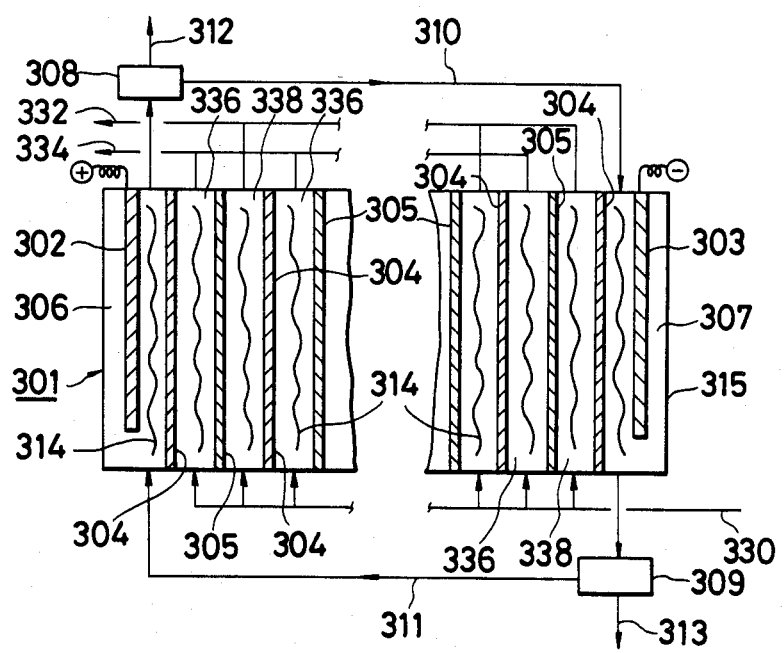
FIG. 21 shows an illustrative view of an electrodialysis apparatus suitable for treating a chlorine ion-containing effluent.

FIG. 21 shows an illustrative figure of the electrodialysis apparatus 193 or 194 employed in the process for treating the effluent discharged from the cooling step of the present invention (see FIG. 4). The electrodialysis cell 301 is provided with an anode chamber 306 and a cathode chamber 307 containing an anode 302 and a cathode 303, respectively, in an electropyte solution, between which chambers cation exchange membranes 304 and anion exchange membranes 305 are alternately arranged by the medium of spacers 314, between which membranes concentration chambers 336 and dilution chambers (desalting 338) are alternately formed. Numeral 315 represents a chamber frame. The anode chamber 306 and the cathode chamber 307 are separated from the adjacent chamber by the cation exchange membranes 304, respectively, and also they are connected by communicating pipes 310 and 311, respectively, provided midway, with gas-liquid separators 308 and 309 as a degassing means, to form a circulating path for the electrolyte solution. The concentration chambers 336 and the dilution chambers 338 are respectively provided with a line for feeding the effluent to be treated 330 and on the opposite side, with a line for discharging concentrated water 334 and a line for discharging diluted water 332. The liquid feed to the concentration chambers 336 and the dilution chambers 338 may be uniformly carried out by way of the liquid feeding line 330, as described above, but two kinds of liquids having different concentrations may be separately fed, respectively, that is, a high concentration liquid being fed to the concentration chambers, and another low concentration liquid, to the dilution chambers. As to the gas-liquid separators 308 and 309, the respective gases formed in the anode 302 and the cathode 303 by electrode reaction are exhausted through exhaust pipes 312 and 313. These gas-liquid separators 308 and 309 may be e.g. a liquid storage tank, and are preferred to be those which can effect supply of the electrolyte solution (an aqueous solution of e.g. sodium sulfate but having a small halogen concentration) or water, blowdown of a portion of the electrolyte solution or pH adjustment thereof, as occasion demands, along with degassing. The electrolyte solution may be a solution of soluble salts consisting of the same cation as that contained in the solution to be treated and an anion from which no gas is formed in the anodic oxidation reaction, and sodium phosphate or the like may be used besides sodium sulfate in the present invention.

The degassing means (gas-liquid separator) provided in the circulating path of the electrolyte solution may be a liquid storage tank having a liquid storage part and a clearance part for degassing, but a means of merely providing a degassing hole in the electrode chamber or connecting pipe may also be employed.

In the electrodialysis apparatus, when an aqueous solution of sodium sulfate is filled in the electrode chambers and an effluent from the desulfurization apparatus, composed mainly of sodium chloride, is fed through a line 330 to carry out electrodialysis operation, then the respective ions in the effluent selectively permeate through the ion exchange membranes 304 and 305 to form concentrated water and diluted water in the concentration chamber 336 and the dilution chamber 338, respectively, and these waters are discharged through lines 334 and 332, respectively. At that time, since the anode chamber contains no halogen ion and yet is separated from the adjacent chamber by the cation exchange membrane, no halogen ion which is anion permeates and hence no halogen gas is formed, and also sodium ion ($Na^+$) decreases through the permeation, while there proceeds a reaction by which sulfuric acid and oxygen gas are formed. The solution containing the thus formed sulfuric acid and oxygen gas is fed through the communicating pipe 310 to the cathode chamber 307. The oxygen gas is removed by the midway gas-liquid separator 308 and exhausted through an exhaust pipe 312.

On the other hand, in the cathode chamber 307, hydrogen ion is reduced to form hydrogen gas, while $Na^+$ permeates from the adjacent chamber into this chamber to form sodium hydroxide, which, however, is neutralized by sulfuric acid fed from the anode chamber 306, to form sodium sulfate. Thus, the solution in the cathode chamber does not become alkaline, and also there occurs no scaling therein due to compounds of Mg, Ca or the like. The solution containing the thus formed sodium sulfate and hydrogen gas is freed from hydrogen gas in the gas-liquid separator 309 midway in the course of communicating pipe 311 through an exhaust pipe 313, and then recycled to the anode chamber 306.

According to the above embodiment, when the saline solution-containing effluent from the desulfurization apparatus is subjected to electrodialysis treatment, it is possible to prevent generation of chlorine gas in the anode and scaling in the cathode. Further, the electrolyte solution is, in principle, not consumed; hence it may be sufficient to supply a small amount of water lost by the electrolysis. Accordingly, the amount of agents such as sodium sulfate consumed becomes also small, as well as it is easy to operate and control the apparatus.

What we claim is:

1. A limestone-gypsum flue gas desulfurization process which comprises:

a cooling step of cooling and dedusting a dust HCl and sulfur oxides ($SO_x$)-containing flue gas and producing an effluent containing chlorine;

an absorption step of contacting the flue gas cooled in the cooling step with a limestone slurry to absorb and remove $SO_x$ contained in the gas thereby forming $CaSO_3$ and $Ca(HSO_3)_2$ and producing cleaned gas;

a pH-adjusting step of adjusting the pH of the resulting slurry containing calcium sulfite $CaSO_3$ and calcium hydrogen sulfite $Ca(HSO_3)_2$ formed in the absorption step;

an oxidation step of oxidizing the resulting slurry obtained in the pH-adjusting step, by contacting it with an oxygen-containing gas to form a gypsum-containing slurry;

a liquid-separation concentration step of concentrating the resulting gypsum-containing slurry obtained in the oxidation step to produce clarified water and a concentrated gypsum slurry; and a step of centrifugally separating gypsum from the concentrated gypsum slurry to produce separated gypsum and a filtrate; and a step of removing heavy metals, removing COD (chemical oxygen demand) components, and electrodialytically concentrating and eliminating chlorine in the effluent discharged from said cooling step.

2. A flue gas desulfurization process of claim 1, wherein the last mentioned step removes suspended solids.

3. A flue gas desulfurization process of claim 1, including vaporizing the resulting concentrated effluent leaving said electrodialytically concentrating step using a boiler flue gas as heat source therefor to obtain a solid chloride.

4. A flue gas desulfurization process of claim 1, including the step of using, desalted water in said process, obtained in said step of electrodialytically concentrating.

5. A flue gas desulfurization process of claim 3 including the step of conducting the flue gas after evaporation from said step of vaporizing to an electrostatic precipitator attached to the boiler.

6. A flue gas desulfurization process of claim 3, wherein said vaporizing includes spraying the chlorine concentrated effluent into the exit duct of an electrostatic precipitator attached to the boiler to subject it to vaporization to dryness.

7. A flue gas desulfurization process of claim 1 wherein said cooling step and said absorption step are carried out in a single tower.

8. A flue gas desulfurization process of claim 1 wherein said effluent-treating step further includes a step of absorbing dithionic acid in the effluent onto a weakly basic ion exchange resion, followed by desorbing the acid from the resin in advance of said pH-adjusting step.

9. A limestone-gypsump flue gas desulfurization process which comprises:

a cooling step of cooling and dedusting a sulfur oxides ($SO_x$)-containing flue gas and producing an effluent;

an absorption step of contacting the flue gas cooled in the cooling step with a limestone (lime) slurry to absorb and remove $SO_x$ contained in the gas thereby forming $CaSO_3$ and $Ca(HSO_3)_x$ and producing cleaned gas;

a pH-adjusting step of adjusting the pH of the resulting slurry containing calcium sulfite $CaSO_3$ and calcium hydrogen sulfite $Ca(HSO_3)_2$ formed in the absorption step to be in the range of 4 to 5;

an oxidation step of oxidizing the resulting slurry obtained in the pH-adjusting step, by contacting it with 1.5 to 3 times the theoretical amount of an oxygen-containing gas to form a gypsum-containing slurry;

a liquid-separation concentration step of concentrating the resulting gypsum-containing slurry obtained in the oxidation step to produce clarified water and a concentrated gypsum slurry; and a step of centrifugally separating gypsum from the concentrated gypsum slurry to produce separated gypsum and a filtrate;

adding the separated gypsum from said step of centrifugally separating to the limestone slurry in said absorption step in an amount of at least 5% by weight of the slurry;

a step of treating the effluent discharged from said cooling, including at least one step of the steps of removing floating solids (FS), removing fluorine (F), removing heavy metals, removing (chemical oxygen demand) components and concentrating chlorine (C), in the effluent wherein said effluent-treating step includes a step of adjusting the pH of the effluent to 1.5 or less for decomposing dithionic acid in the effluent, and a step of heating the effluent of a pH of 1.5 or less to 60 C. or higher; and said effluent-treating step further including a step of absorbing dithionic acid in the effluent onto a weakly basic ion exchange resin, followed by desorbing the acid from the resin in advance of said pH-adjusting step.

* * * * *